Sept. 20, 1949.   McDONALD D. SMITH ET AL   2,482,696
PIPE-LINE STOPPER
Filed Nov. 29, 1944   5 Sheets-Sheet 1

Inventors
McDonald D. Smith
Gorham F. Freer
Attorneys

Sept. 20, 1949.  McDONALD D. SMITH ET AL  2,482,696
PIPE-LINE STOPPER

Filed Nov. 29, 1944  5 Sheets-Sheet 3

Inventors
McDonald D. Smith
Gorham F. Freer
By Cushman Darby & Cushman
Attorneys Sept. 20, 1949.  McDONALD D. SMITH ET AL  2,482,696
PIPE-LINE STOPPER
Filed Nov. 29, 1944  5 Sheets-Sheet 4

Inventors
McDonald D. Smith,
Gorham F. Freer.

Patented Sept. 20, 1949

2,482,696

UNITED STATES PATENT OFFICE 2,482,696

PIPE-LINE STOPPER

McDonald D. Smith, Washington, D. C., and Gorham F. Freer, Arlington, Va., assignors to Mueller Co., Decatur, Ill., a corporation of Illinois Application November 29, 1944, Serial No. 565,704

24 Claims. (Cl. 138—94)

The present invention relates to pipe line stoppers of the type insertable into a pressure main through a lateral opening in the main. An object of the invention is to provide a compact and relatively simple stopper which can be inserted through a lateral opening of substantially smaller diameter than the inside diameter of the main and then can be expanded so as to provide a rigid barrier across the main and one which is substantially leakproof.

In the accompanying drawings, the invention is shown in two embodiments by way of example. According to the first embodiment, the stopper includes a rubber bag which is substantially diametrically distended into sealing engagement with opposite wall portions of the main to provide a transverse seal. In the second embodiment, the bag is omitted and the transverse seal is perfected by means of the engagement of sealing surfaces on the relatively movable parts which constitute the barrier.

Figure 1:
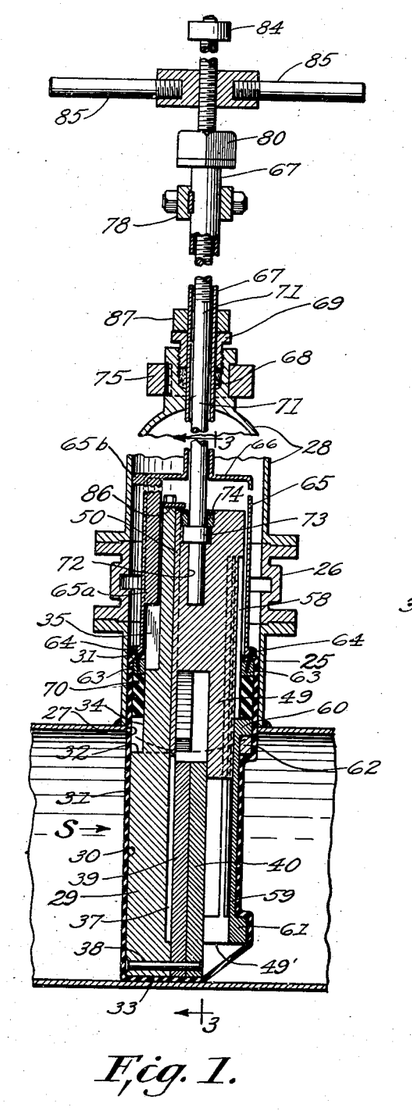
Figure 1 shows an installation including a stopper in accordance with the first embodiment and control means therefor in a preliminary association with the main, the parts being shown in section substantially on the axis of the main.
Figure 2:
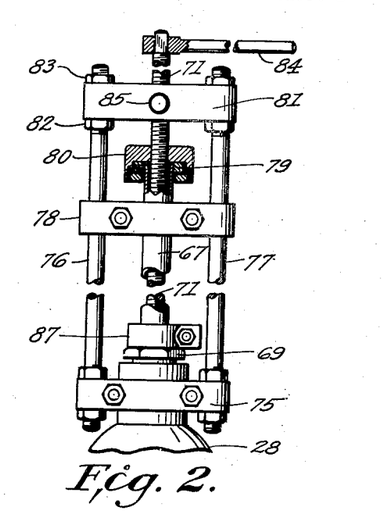
Figure 2 is an elevation of the upper portion of the installation of Figure 1 as seen from the left of the latter figure.

Referring to Figure 1, preliminary to the use of apparatus in accordance with the present invention, a cylindrical collar 25 is welded to the main with its axis intersecting the axis of the main, a control valve 26 is secured to the flange of collar 25, boring equipment is secured to valve 26, a hole 27, whose diameter is the same as the inner diameter of collar 25 is bored, the drill withdrawn, valve 26 closed, and the boring equipment removed. This is all accomplished in known manner without any substantial loss of pressure from the main. There is now secured to the valve 26 apparatus including a barrel or elongated bonnet 28 which houses a stopper S in accordance with the invention. In Figure 1 the stopper is shown as having been lowered, after opening valve 26, from the barrel 28 and into a preliminary disposition in the main.

The stopper includes a vertical post or elongated body 29 which has a transversely curved outer face 30 of somewhat less than semicylindrical extent, its radius being less than that of the opening 27 by something less than the thickness of the rubber bag 31. (By the word "rubber," as used herein, is meant any flexible rubber or rubber-like material, natural or artificial.) The surface 30 terminates upwardly at an arcuate shoulder 32 which, when the body is positioned in the main, as shown in Figure 1, is horizontal and slightly below the lowest point of the opening 27. As most clearly shown in Figure 3, the lower end of the body has a face 33 curved as the interior of the main and conforming the bottom of the bag 31 thereto, although preferably the bag will be molded with this curve.

Figures 8, 9, 10:
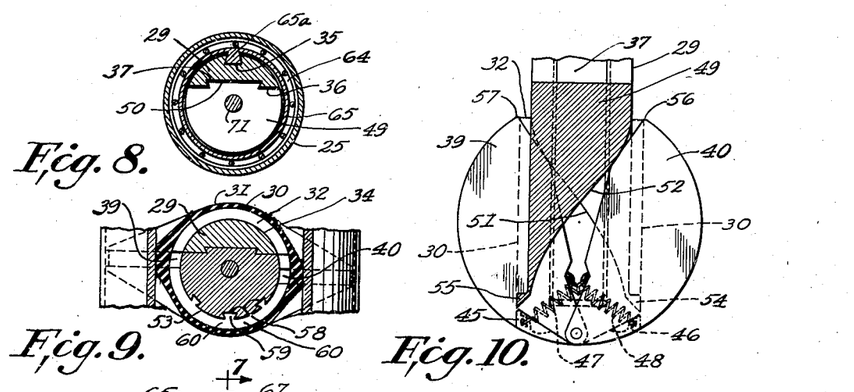
Figure 8 is a section on line 8—8 of Figure 6.
Figure 9 is a section on line 9—9 of Figure 6.
Figure 10 is a section on line 10—10 of Figure 7.
Figure 11:
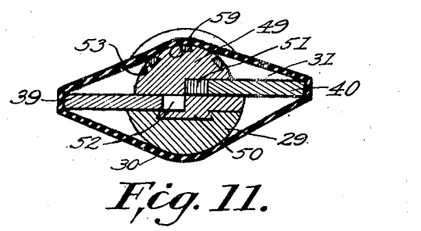
Figure 11 is a section on line 11—11 of Figure 7.
Figure 12:
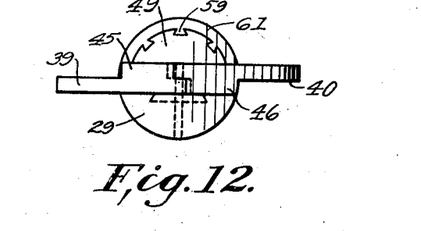
Figure 12 is a view taken on line 12—12 of Figure 7 with the bag removed.

Above the shoulder 32 body 29 has a curved surface 34 coaxial with the surface 30 which surface is provided with an axially extending undercut groove 35, Figures 1 and 8. On its inner side the body 29 has a flat vertical face 36 provided with an axially extending undercut groove 37 which runs from the top of the body nearly to its lower end as particularly shown in Figure 1.

Pivoted to the lower end of the body 29 on a bolt or pin 38 which is radially disposed relative to the face 36 and bi-sects the arc thereof, is a pair of vanes or wings 39 and 40. The vanes are mounted for swinging in face-to-face contact in parallel planes. In what will be termed the folded relation of the vanes, as particularly shown in Figure 3, a straight upper edge portion 41 of van 39 is in contact with the inner wall of the undistended bag 31, and the opposite edge 42 of the vane, which is curved substantially as the inner curvature of the main is in contact with the opposite inner wall of the bag. Vane 40 has similar edge portions 43 and 44. At their lower portions the vanes are provided with wedge-shaped formations 45 and 46, respectively, each in the plane of the other vane and connected with the latter by means of tension springs 47 and 48, partly received in sockets in portions 45 and 46, respectively, and acting to pull the vanes into the folded relation of Figure 3 and to maintain them there.

Figures 3, 4:
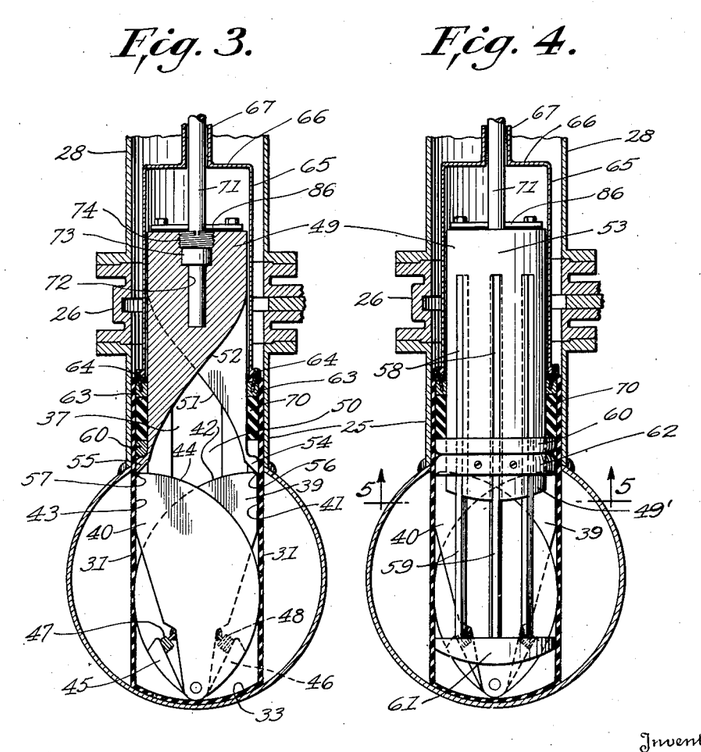
Figure 3 is a section substantially on line 3—3 of Figure 1.
Figure 4 is a view like that of Figure 3 but largely in elevation.
Figure 5:
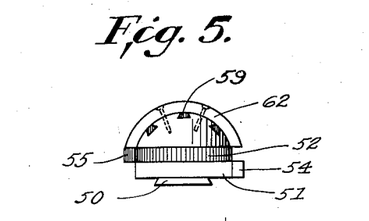
Figure 5 is a bottom plan view of an operating member substantially on line 5—5 of Figure 4.

Reference numeral 49 represents a cam slide having a rib 50 engaged in the groove 37 of the body 29. The slide 49 is provided with diagonally extending offset cam faces 51 and 52 in the planes of vanes 39 and 40 respectively. The slide 49 has a curved outer face 53 whose curvature is complementary to the curved face 34 of the body 29 as shown in Figures 8 and 9 except for lower extensions 54 and 55, Figure 3, which terminate outwardly in the cylinder of the body surface 30. In Figure 3 it will be noted that the cam faces 51 and 52 are continued in the extensions 54 and 55 so that the lower extremities of the cam surfaces are positioned outwardly of the angular end edges 56 and 57 which extend between the edges 41 and 42 and 43 and 44 of the vanes 39 and 40, respectively.

Figures 6, 7:
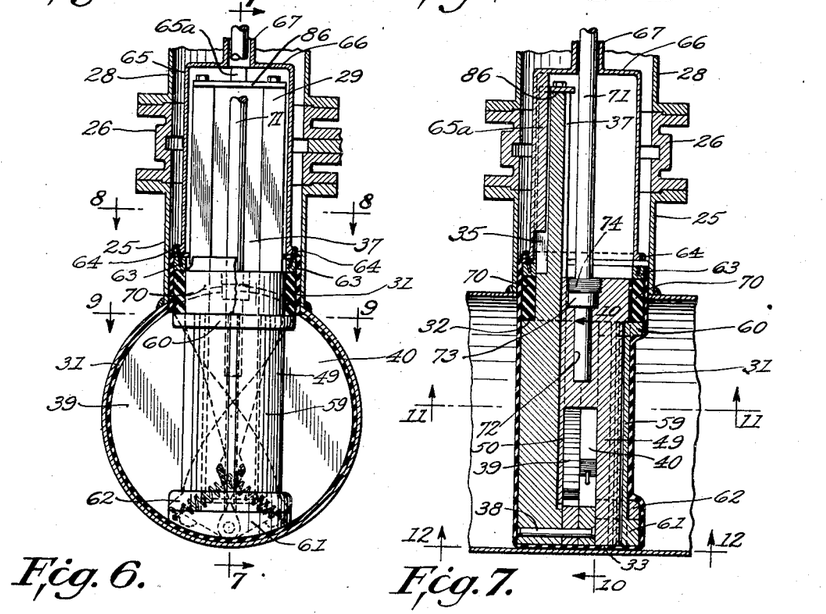
Figure 6 is a view like that of Figure 4 but with the stopper in operative disposition.
Figure 7 is a section on line 7—7 of Figure 6.

Formed in the curved face of slide 49 are a number of axially extending parallel undercut grooves 58 which slidably receive splines 59 whose upper ends are joined by an arcuate head portion 60, Figures 4, 7 and 9. As can be seen in Figure 9 the ends of the head 60 terminate in the adjacent face planes of vanes 39 and 40 and the outer curvature of the head is on the same radius as that of the body face 30. The lower ends of the splines are joined by a foot portion 61 which has the same curvature and arcuate extent as the head 60, its bottom edge being curved substantially as the inside of the main, as shown in Figure 4. Secured to the slide near the lower end thereof and between the head and foot portions 60 and 61 is an arcuate bar 62 which has the same outside curvature, or at least on no greater radius, as the said portions. The distance between the upper surface of the head 60 and the bottom of the foot 61 is the same as the distance between the shoulder 32 and the bottom 33 of the body 29.

The top of the bag 31 is turned over on top of a metal ring 63 which freely embraces the upper part of the body and slide and is clamped between the ring and a flange 64 at the lower end of a cylindrical housing 65 which surrounds the upper portions of the body and slide for free axial movement, relative turning movement being prevented by a rib 65a on housing 65 engaged in groove 35 of the body. The housing has a top wall 66 from which a coaxial tubular extension projects upwardly through a gland 68 at the top of the barrel 28, the gland including a nut 69. Ring 63 has the same outer radius as the body shoulder 32 and has affixed to its lower face a rubber body 70 in the form of a ring of the same radius. In the normal position of parts shown in Figures 1, 3 and 4 the lower face of the rubber ring is substantially above the body shoulder 32 and consequently cannot interfere with the swinging of the vanes. Head 60 is held by bar 62 substantially against the bottom of the ring 70 and the foot 61 is in the elevated position shown in Figures 1 and 4.

A rod 71 extends through the tubular extension 67 and has its lower end rotatably received in a bore 72 formed in the upper end of slide 49 on the axis of its curved surface 53. Bore 72 terminates upwardly in a coaxial enlargement which receives an annular rib 73 integral with rod 71, the enlargement being threaded above the rib and having engaged therein a retaining ring 74 so that a swivel connection is established between the slide and the rod.

Secured to the upper end of barrel 28 is a cross bar 75 which supports upright rods 76 and 77 whose common axial plane includes the axis of rod 71. A cross head 78 is slidable on rods 76 and 77 and is fixedly clamped and keyed to the tube 67. The upper end of the latter has threaded and fixed thereon a ring 79 which is received in an annular channel of a nut 80 which is threaded on the threaded upper end of rod 71. The latter is threaded in a cross bar 81 which is secured to the upper ends of rod 76 and 77 between abutment nuts 82 and retaining nuts 83. The upper extremity of rod 71 is squared to receive any suitable wrench 84.

When the apparatus is to be transported, the stopper S is pulled completely within the barrel 28 and in order that this may be conveniently accomplished, the cross-head 78 and nuts 83 may be removed so that the cross-bar may be pulled away from the barrel, using handles 85 on the bar, so that rod 71, which is followed by the tube 67 in view of the swivel connection 79, 80, will pull the stopper into the barrel. While the body 29 will ordinarily be satisfactorily held up by the bag, it can be provided at its upper end with a stop 86 overlying groove 37 so as to be engageable by the upper end of the slide 49. The stopper is retainable in retracted position by means of a clamping ring 87 which abuts the top of nut 69.

After the barrel 28 has been positioned on valve 26, Figure 1, the clamping ring 87 is loosened and, valve 26 having been opened, the operator pulls downwardly on handles 85 so as to bring the stopper into the position shown and nuts 83 and cross-head 78 are applied. The common axial plane of rods 71, 76 and 77 is at right angles to the pivot pin 38 and so by positioning this plane at right angles to the axis of the main, the positioning of pin 38 in proper axially extending relation to the main will be assured.

With the parts positioned as shown in Figure 1, wrench 85 is turned so as to thread rod 71 downwardly, nut 80 being held so that its elevation is maintained. As slide 49 lowers, the cam faces 51 and 52 swing vanes 39 and 40, respectively, counter-clockwise and clockwise, Figure 3, until they assume the expanded relation shown in Figures 6, 7, 9, 10 and 11 wherein they tightly conform opposite sides of the bag to opposite wall portions of the main. The slide has a lower surface 49', Figure 4, rounded on the same curve as the bottom surface 33 of the body 29 and when these surfaces come into register, the lower end of rib 50 may abut the bottom wall of groove 37 so that extended bottom seating of the bag, longitudinally of the main, is afforded, the seating being augmented by the lower portions of the vanes including the formations 45 and 46. However, it will ordinarily be desirable to provide clearance between the lower end of rib 50 and the bottom of groove 37 to promote equalizing action of the vanes.

While the slide is moving downwardly, its abutment portion 62 engages the top of foot 61 of the frame which includes ribs 59 and head 60 so that the frame is carried downwardly to the position shown in Figure 7 with a further bottom seating effect by the foot, the top surface of the head being brought into the plane of the top surface of the body shoulder 32. At this point nut 80 is threaded down on rod 71, thus lowering the housing 65 and rings 63 and 70 until the latter seats against the interrupted annular seat provided by the body shoulder 32 and the head 60. The original elevated position of the ring 70 permitted the free projection of the vanes which would be obstructed if the ring were on shoulder 32 whose level is below the upper extremities of the folded vanes. Further downward movement of housing 65 causes ring 70 to be bulged outwardly, thus forcing the bag into tight peripheral engagement with the wall of opening 27. While peripheral engagement is mentioned, it will be understood that it is only essential that the up-stream half of the opening be sealed. In Figure 1 the up-stream side is assumed to be to the left of the stopper.

The body 29 and the slide 49 provide a rigid support for the expanded vanes and the stopper will stand against any pressure apt to be encountered. Due to the extended bottom seating surface provided by the body, the vanes and the slide, and to the fact that these are borne powerfully downwardly by the tube 67 and the rod 71, there is little possibility of the stop being canted by the up-stream pressure. However, to take care of extreme reaction, a lug 65b, Figure 1, may be provided on the housing 65 at its top and on the upstream side, this lug bearing against the inner wall of the barrel 28. It will be seen that where the distending action of the vanes terminates at their tops, the distending action of ring 70 begins so that there is a continuous seal throughout the inside of the main.

When the stopper is to be removed, nut 80 is threaded upwardly relative to rod 71 so that ring 70 is returned to the position shown in Figures 1, 3 and 4. Hereupon nut 80 is held against rotation and rod 70 is threaded upwardly to return the slide and associated parts to the relation shown in Figures 1, 3 and 4. The bag acts to return the vanes but their return is assured by the springs 47 and 48.

The stopper can now be pulled up into the barrel 28 as previously described, valve 26 shut, and the barrel removed.

In the second embodiment, shown in Figures 13 to 19, the body, designated by the reference numeral 90, is generally the same as in the first embodiment, having upper and lower outer cylindrical surfaces 91 and 92 separated by the annular shoulder 93, the inner flat face of the body being provided with a longitudinally extending undercut groove 94. The bottom face of the body has secured thereto a rubber covering or strip 95, since in this case, as previously mentioned, the rubber bag is omitted. Vanes 96 and 97 are pivoted to the body in the same manner as before, their arcuate edges being provided with rubber coverings 98 and 99, respectively, which also cover the curved faces of the wedge-shaped portions 100 and 101. The latter also have rubber facings 102 and 103 which are apertured to clear the return springs. As is most clearly seen in Figure 19, the faces 96' and 97' of the vanes, these faces being remote from the body 90, are in parallel planes inclined upwardly and toward the body, and the outer face of portion 100 is similarly inclined.

Figures 18, 19:
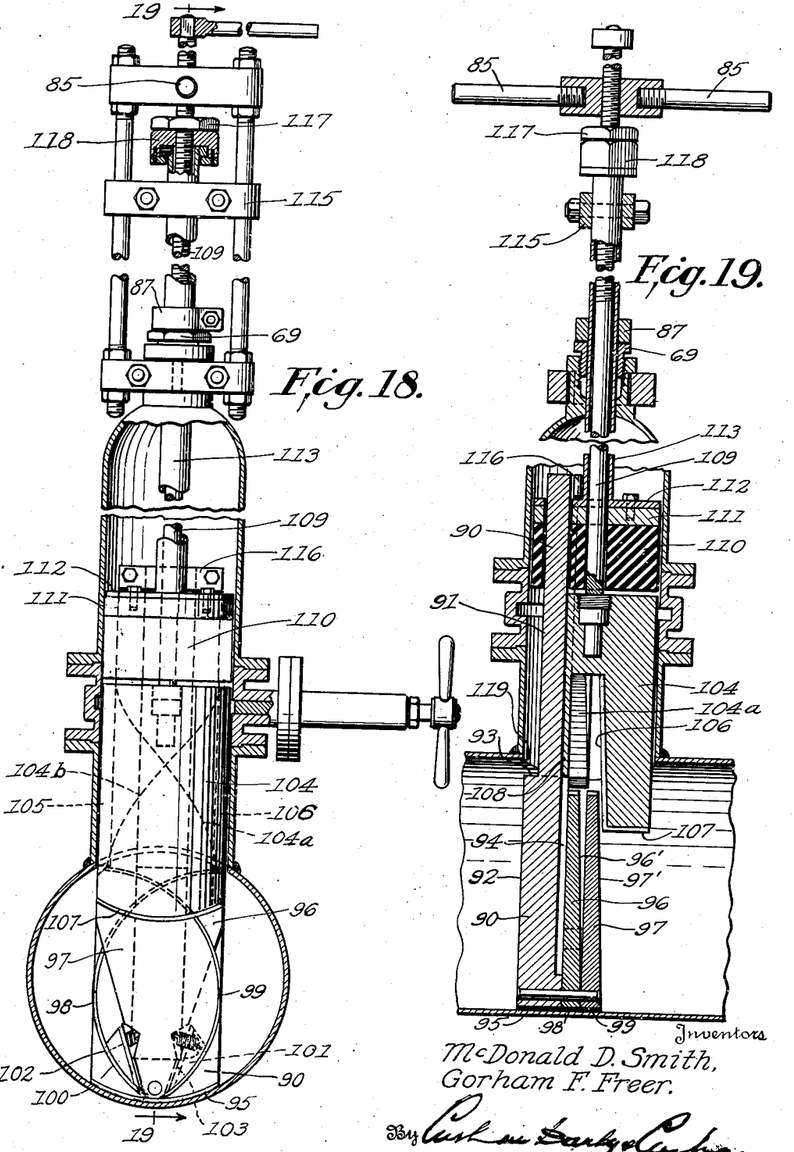
Figure 18 shows an installation with the stopper of Figures 13 to 16 in a preliminary association with the main.
Figure 19 is a section on line 19—19 of Figure 18.

The slide has a rib 108 slidable in the groove 94 and the outer face of the slide is cylindrical on the same radius as the portion 92 of the body. The slide has swiveled thereto an operating rod 109 which passes upwardly, reciprocably but with sealing contact, through a rubber block or body 110 which is adhered to a plate 111 which is in turn secured to a plate 112 from which rises a tubular member 113 around rod 109. Elements 110, 111 and 112 are of circular cross-section on the same radius as body portion 92 and are each provided with an axially extending opening slidably receiving portion 91 of the body, the opening in the rubber ring 110 being shown at 114 in Figure 17 and the other openings being of the same shape. Consequently, the body 90 is held against turning by plate portions 111 and 112 and these are in turn held against turning by tube 113 through the cross-head 115. The slide 104 has inner faces inclined in parallel relation to the faces 96' and 97' and provided with rubber coverings 105 and 106, Figure 15, and the bottom face of the slide has a rubber covering 107. A stop 116 is secured to the upper end of body portion 91 for engagement by plate 112 and when this engagement exists the bottom of the rubber ring 110 is spaced somewhat above the top of slide 104 as shown in Figures 18 and 19.

Figures 13, 14, 16, 17:
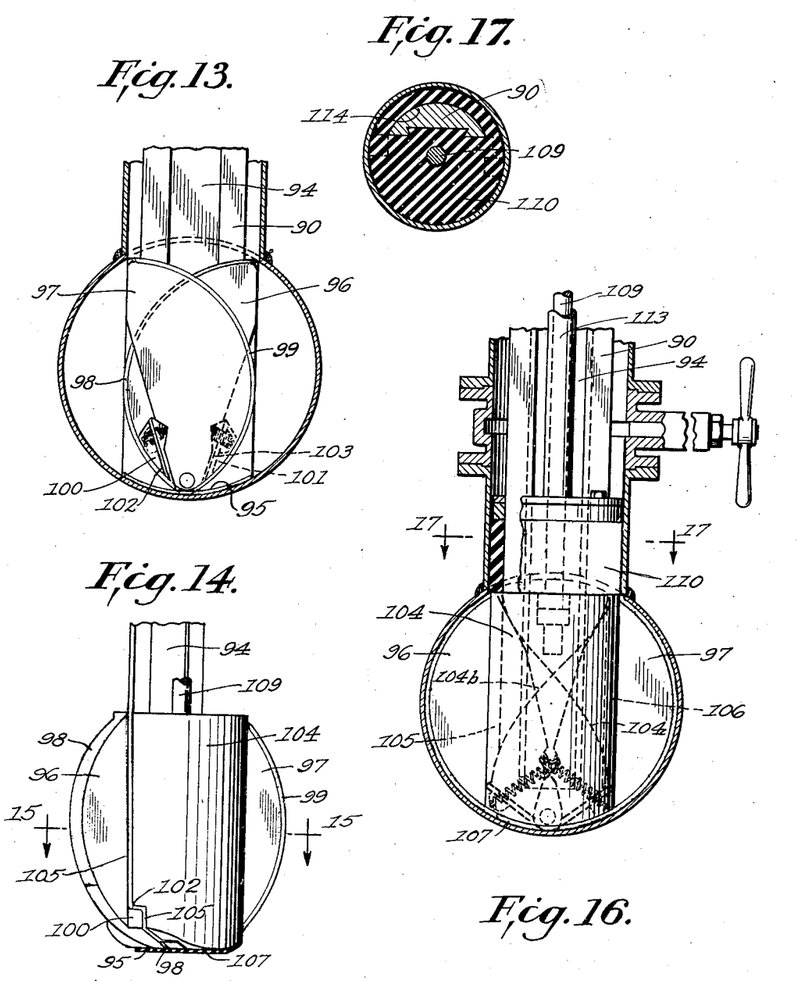
Figure 13 is an elevation of the stopper of the second embodiment with parts removed.
Figure 14 is an isometric view of the stopper of the second embodiment with the parts in operative disposition.
Figure 16 shows the stopper of Figure 14 in operative association with a main.
Figure 17 is a section on line 17—17 of Figure 16.
Figure 15:
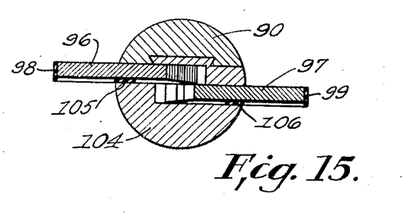
Figure 15 is a section on line 15—15 of Figure 14.

The latter figures indicate the relation of parts after the stopper has been lowered into the main, this being accomplished in the same manner as described in connection with the first embodiment. In the present instance a lock nut 117 may be engaged with the swivel nut 118 so that when rod 109 is turned to move the slide downwardly, the tube 113 and associated elements will move therewith in constant relation. Downward movement of the slide causes the vanes to be expanded by the cam faces 104a and 104b, without interference with the slightly elevated rubber plug, so that their rubber shoes are forced into sealing engagement with opposite portions of the main. As this action is completed, or substantially so, the shoe 107 at the bottom of the slide comes into contact with the main and the rubber facings 105 and 106 wedgingly engage vane surfaces 96' and 97' and the outer face of portion 100 to form a seal therewith, the lower ends of the cam faces 104a and 104b sealing with the pads 102 and 103. At this point, the top of the slide is level with the body shoulder 93. Lock nut 117 is now loosened and nut 118 is threaded downwardly so that the rubber ring 110 is pressed against body shoulder 93 and the top of the slide and thus is expanded into tight peripheral engagement with the opening 119 in the main, as shown in Figure 16. The rubber block is also bulged downwardly to close any gaps at the upper ends of the vanes so that a complete seal is provided.

The same rigid substantially non-leaking barrier as in the first embodiment is thus provided and it will be evident that any undue tendency to cant under pressure will be prevented by the engagement of plate 112 with the neck fitting, Figure 16. The upstream side is assumed to be at the left, Figure 19.

From the above, it will be evident that the invention is susceptible of varied embodiment, and consequently we do not limit ourselves to specific form and arrangement of parts except as in the following claims. Positional terms, such as "upright," etc., are used as a matter of convenience and not of limitation.

We claim:

1. A pipe line stopper comprising an elongated rigid body, a pair of vanes pivoted to said body on an axis extending transversely of the body, said vanes being foldable together about said axis and when so folded being insertable together with said body through a lateral opening in a main with said axis extending lengthwise of the main, said opening being of smaller diameter than the inside diameter of the main, and means associated with said body and operable from the exterior of the main to oppositely project said vanes by swinging them about said axis, said vanes having continuous outer edges curved substantially as the inside of the main, the edges of each of said vanes when projected extending from said opening substantially to the opposite side of said main.

2. A stopper according to claim 1 including spring means acting to retract said vanes.

3. A pipe line stopper comprising an elongated rigid body, a pair of vanes pivoted to said body on an axis extending transversely of the body, said vanes being foldable together about said axis, a slide associated with said body for relative lengthwise reciprocation, said slide having cam faces cooperable with said vanes respectively and adapted upon movement of the slide in one direction to move said vanes from folded to oppositely projected relation; said body, slide and vanes being insertable, when the vanes are folded, through a lateral opening in a main with said axis extending lengthwise of the main, said opening having a diameter less than the inside diameter of the main, and means operable from the exterior of the main for moving said slide whereby to oppositely project said vanes by swinging them about said axis, said vanes having continuous outer edges curved substantially as the inside of the main, the edges of each of said vanes when projected extending from said opening substantially to the opposite side of said main.

4. A stopper according to claim 3 wherein said body and vanes are enveloped by an imperforate rubber bag whose closed end abuts the wall of the main opposite said opening when the stopper is operatively disposed in the main and whose sides are distended into contact with the inside of the main when said vanes are projected.

5. A stopper according to claim 3 wherein said body and vanes are enveloped by an imperforate rubber bag whose closed end abuts the wall of the main opposite said opening when the stopper is operatively disposed in the main and whose sides are distended into contact with the inside of the main when said vanes are projected, wherein the bag has a portion which is in said opening when the stopper is operatively disposed, and wherein means are provided for expanding said portion into sealing engagement with at least the upstream half of the edge of said opening.

6. A stopper according to claim 3 including spring means acting to return said vanes when said slide is reversely moved.

7. A pipe line stopper comprising an elongated rigid body, a pair of vanes pivoted to said body on an axis extending transversely of the body for relative swinging in parallel planes, said vanes being foldable together about said axis in mutually lapping arrangement, a slide associated with said body for relative lengthwise reciprocation, said slide having offset cam faces cooperable with said vanes respectively and adapted upon movement of the slide in one direction to move said vanes from folded to oppositely projected relation; said body, slide and vanes being insertable, when the vanes are folded, through a lateral opening in a main with said axis extending lengthwise of the latter, said opening having a diameter less than the inside diameter of the main, and means operable from the exterior of the main for moving said slide whereby to oppositely project said vanes by swinging them about said axis, said vanes having continuous outer edges curved substantially as the inside of the main, the edges of each of said vanes when projected extending from said opening substantially to the opposite side of said main.

8. A stopper according to claim 7 wherein said cam faces are diagonally disposed on said slide.

9. A pipe line stopper comprising an elongated rigid upright body, a pair of vanes pivoted to said body at one side thereof adjacent the lower end thereof on an axis extending transversely of the body, said vanes being foldable together about said axis and when so folded being insertable with said body through a lateral opening in a main with said axis extending lengthwise of the main, said opening being of smaller diameter than the inside diameter of the main, an arcuate horizontal shoulder on the other side of said body below the upper extremities of the folded vanes, means associated with said body and operable from the exterior of the main to oppositely project said vanes by swinging them about said axis, said vanes having outer edges curved substantially as the inside of the main, a rubber body above said shoulder substantially conforming in curvature thereto and extending across the swinging planes of said vanes, and means connected to said rubber body and operable from the exterior of the main for lifting said rubber body away from said shoulder to permit free projection of said vanes and for lowering said rubber body and pressing it against said shoulder to bulge it beyond the latter.

10. Apparatus according to claim 9 wherein the rubber body is in the form of a ring, and wherein means is provided including an arcuate shoulder for supporting said ring in conjunction with the body shoulder.

11. Apparatus according to claim 9 wherein the rubber body is in the form of a ring, wherein the vane projecting means includes a slide movable longitudinally of said upright body, and wherein the slide carries a shoulder which, upon the lowering of the slide to completely project the vanes, comes into position to support said ring in conjunction with the body shoulder.

12. Apparatus according to claim 9 wherein a rubber bag envelopes said body and vanes and extends upwardly above said rubber body and is connected to the lifting and pressing means for the latter.

13. Apparatus according to claim 9 wherein the rubber body is in the form of a ring wherein the vane projecting means includes a slide movable longitudinally of said upright body, and wherein the slide has a top surface which, upon the lowering of the slide to completely project the vanes, comes into position to support said ring in conjunction with the body shoulder.

14. Apparatus according to claim 9 wherein the rubber body is in the form of a ring wherein the vane projecting means includes a slide movable longitudinally of said upright body, wherein the curved edges of the vanes are rubber covered, and wherein the vanes and slide have rubber covered inclined faces which wedge together to form a seal between the vanes and the slide when the latter is completely lowered.

15. A pipe line stopper comprising an elongated rigid body, a pair of vanes pivoted to said body on an axis extending transversely of the body, said vanes being foldable together about said axis, a slide associated with said body for relative lengthwise reciprocation, said slide having cam faces cooperable with said vanes respectively and adapted upon movement of the slide in the direction to move said vanes from folded to oppositely projected relation; said body, slide and vanes being insertable, when the vanes are folded, through a lateral opening in a main with said axis extending lengthwise of the main, said opening having a diameter less than the inside diameter of the main, means operable from the exterior of the main for moving said slide whereby to oppositely project said vanes by swinging them about said axis, said vanes having outer edges curved substantially as the inside of the main and which are rubber covered, and rubber covered inclined faces on said vanes and slide which wedge together to form a seal between the vanes and the slide when the latter has fully projected said vanes.

16. A pipe line stopper comprising an elongated rigid body member and a slide member guided by said body member for longitudinal movement relative thereto, a pair of vanes normally extending longitudinally of one of said members and pivoted thereto transversely at their same ends in laterally swinging relation, said vanes when in normal relation being insertable together with said members through a lateral opening in a main smaller than the inside diameter of the main with the vanes disposed transversely of the main, means on the other of said members for projecting said vanes upon relative sliding movement of said members, said vanes having outer edges curved substantially as the inside of the main, one of said members having a foot surface curved substantially as the inside of the main, compressible means engaged between said curved surface and the bottom of the main and between said curved outer edges and the sides of the main when the stopper is inserted and the vanes are projected whereby to provide a continuous seal with the main around to said opening, a deformable sealing element surrounding said members at the ends of the vanes remote from said foot surface, and means for circumferentially distending said sealing element to seal said opening and complete a barrier across the main.

17. Structure according to claim 16 wherein the vanes are pivoted on a common axis.

18. Structure according to claim 16 wherein the vanes are pivoted on a common axis and in mutually overlapping relation.

19. Structure according to claim 16 wherein said compressible means is constituted by an imperforate rubber bag.

20. A pipe line stopper comprising an elongated rigid body member and a slide member guided by said body member for longitudinal movement relative thereto, a pair of vanes normally extending longitudinally of one of said members and pivoted thereto transversely at their same ends in laterally swinging relation, said vanes when in normal relation being insertable together with said members through a lateral opening in a main smaller than the inside diameter of the main with the vanes disposed transversely of the main, means on the other of said members for projecting said vanes upon relative sliding movement of said members, said vanes having outer edges curved substantially as the inside of the main, one of said members having a foot surface curved substantially as the inside of the main, and compressible means engaged between said curved surface and the bottom of the main and between said curved outer edges and the sides of the main when the stopper is inserted and the vanes are projected, whereby to provide a continuous seal between the stopper and main around to said opening.

21. Structure according to claim 20 wherein the vanes are pivoted on a common axis.

22. Structure according to claim 20 wherein the vanes are pivoted on a common axis and in mutually overlapping relation.

23. Structure according to claim 20 wherein said compressible means is constituted by an imperforate rubber bag.

24. A pipe line stopper comprising an elongated rigid body member and a slide member guided by said body member for longitudinal movement relative thereto, a pair of vanes normally extending longitudinally of one of said members and pivoted thereto transversely at their same ends in laterally swinging relation, said vanes when in normal relation being insertable together with said members through a lateral opening in a main smaller than the inside diameter of the main with the vanes disposed transversely of the main, the pivot point of said vanes being located adjacent one side wall of the conduit when said vanes are inserted, means on the other of said members for separating the free ends of said vanes to project said vanes upon relative sliding movement of said members, said vanes having continuous outer edges curved substantially as the inside of the main, one of said members having a foot surface curved substantially as the inside of the main, and compressible means engaged between said curved surface and the bottom of the main and between said curved outer edges and the sides of the main when the stopper is inserted and the vanes are projected, the edges of each of said vanes when projected extending from said opening substantially to said curved foot surface, whereby to provide a continuous seal between the stopper and main around to said opening.

McDONALD D. SMITH.
GORHAM F. FREER.

REFERENCES CITED

The following references are of record in the file of this patent:

UNITED STATES PATENTS

| Number | Name | Date |
| --- | --- | --- |
| 1,885,896 | Carr et al. | Nov. 1, 1932 |
| 2,285,392 | Cline | June 9, 1942 |
| 2,285,779 | Mueller et al. | June 9, 1942 |

Disclaimer 2,482,696.—*McDonald D. Smith*, Washington, D. C., and *Gorham F. Freer*, Arlington, Va. PIPE-LINE STOPPER. Patent dated Sept. 20, 1949. Disclaimer filed May 31, 1951, by the assignee, *Mueller Co.*

Hereby enters this disclaimer to claims 20 and 24 of said patent.

[*Official Gazette July 10, 1951.*]